US007795748B2

(12) United States Patent
DeAngeles

(10) Patent No.: US 7,795,748 B2

(45) Date of Patent: Sep. 14, 2010

(54) SYSTEM AND PROCESS FOR GENERATING HYDROELECTRIC POWER

(76) Inventor: Steven J. DeAngeles, 6657 N. Lightfoot Ave., Chicago, IL (US) 60646

( * ) Notice: Subject to any disclaimer, the term of this patent is extended or adjusted under 35 U.S.C. 154(b) by 82 days.

(21) Appl. No.: 12/328,864

(22) Filed: Dec. 5, 2008

(65) Prior Publication Data

US 2009/0140525 A1 Jun. 4, 2009

Related U.S. Application Data

(63) Continuation-in-part of application No. 11/998,360, filed on Nov. 30, 2007.

(51) Int. Cl.
*F03B 13/00* (2006.01)
*H02P 9/04* (2006.01)

(52) U.S. Cl. ............................. 290/43; 290/53; 290/54

(58) Field of Classification Search .................. 290/42, 290/43, 53, 54; 416/85; 60/495, 496, 497, 60/501, 505, 698, 502, 398; 417/331, 333
See application file for complete search history.

(56) References Cited

U.S. PATENT DOCUMENTS

| | | | | |
|---|---|---|---|---|
| 2,470,312 A * | 5/1949 | Levin | 60/496 |
| 3,047,207 A * | 7/1962 | Baldwin et al. | 417/333 |
| 4,071,305 A * | 1/1978 | Ootsu | 417/334 |
| 4,211,077 A * | 7/1980 | Cassidy | 60/398 |
| 4,321,475 A * | 3/1982 | Grub | 290/52 |
| 4,398,095 A * | 8/1983 | Ono | 290/53 |
| 5,243,224 A | 9/1993 | Tagney | |
| 6,041,596 A | 3/2000 | Royer | |

(Continued)

FOREIGN PATENT DOCUMENTS

JP 54011517 A * 1/1979

(Continued)

OTHER PUBLICATIONS

Non final Office Action mailed Sep. 14, 2009, U.S. Appl. No. 11/627,008.

*Primary Examiner*—Julio Cesar Gonzalez
(74) *Attorney, Agent, or Firm*—Kelly & Krause, LP; Joseph P. Krause

(57) ABSTRACT

A system and process for generating hydroelectric power within a body of water uses head pressure existing between two depths of the water. A vertically arranged conduit has an upper water intake and is in fluid communication with a reservoir situated at a lower depth. In a first cycle, water flow is established in the conduit between the water intake and lower reservoir when the reservoir is substantially full of air but at a hydrostatic pressure less than the hydrostatic pressure at the top of the water conduit. A turbine mounted adjacent the reservoir and at a lower depth than the water intake drives an electric generator. As water is introduced into the reservoir, air is scavenged by a compressor and used to drive water from a second reservoir. After the first reservoir is generally full of water, valves are provided to cease the flow of water through the water intake and flow of air out the exhaust tube. An air pump thereafter introduces air scavenged from the first reservoir into the second reservoir to force water out of a second reservoir water outlet port. The generating cycle is then repeated.

15 Claims, 3 Drawing Sheets

U.S. PATENT DOCUMENTS

| | | | | |
|---|---|---|---|---|
| 6,861,766 | B2 | 3/2005 | Rembert | |
| 6,964,165 | B2 * | 11/2005 | Uhl et al. | 60/495 |
| 7,012,341 | B2 * | 3/2006 | Matsubara | 290/43 |
| 2008/0025852 | A1 * | 1/2008 | Davis | 417/331 |
| 2008/0264056 | A1 * | 10/2008 | Tung | 60/496 |

FOREIGN PATENT DOCUMENTS

SU 635467 A * 11/1978

* cited by examiner

SYSTEM AND PROCESS FOR GENERATING HYDROELECTRIC POWER

CROSS REFERENCE TO RELATED APPLICATION

This application is a continuation-in-part of U.S. application Ser. No. 11/998,360 entitled, "System and Process for Generating Hydroelectric Power" by Steven J. De Angeles, filed on Nov. 30, 2007, the entire contents of which are incorporated herein by reference.

FIELD OF THE INVENTION

This invention relates to electric energy generation systems and methods. More particularly, this invention relates to a system and method for generating electrical energy using head pressure or hydrostatic water pressure.

BACKGROUND

Attempts have been made to generate electricity without also disrupting ecosystems, which always happens when a river is dammed, without generating environmental pollutants, which always happens when fossil fuels are burned and, without using inherently dangerous fissile materials, which nuclear power requires. While wind turbines might be considered unsightly and tidal systems require their being located proximate to the ocean, systems and methods for generating electric power that use forces of nature are environmentally harmless. A system and method for generating electric power that does not depend on the relatively unpredictable wind, or solar energy that is not available at night and which does not necessarily require placement in an ocean would be an improvement over the prior art.

DETAILED DESCRIPTION

Figure 1:
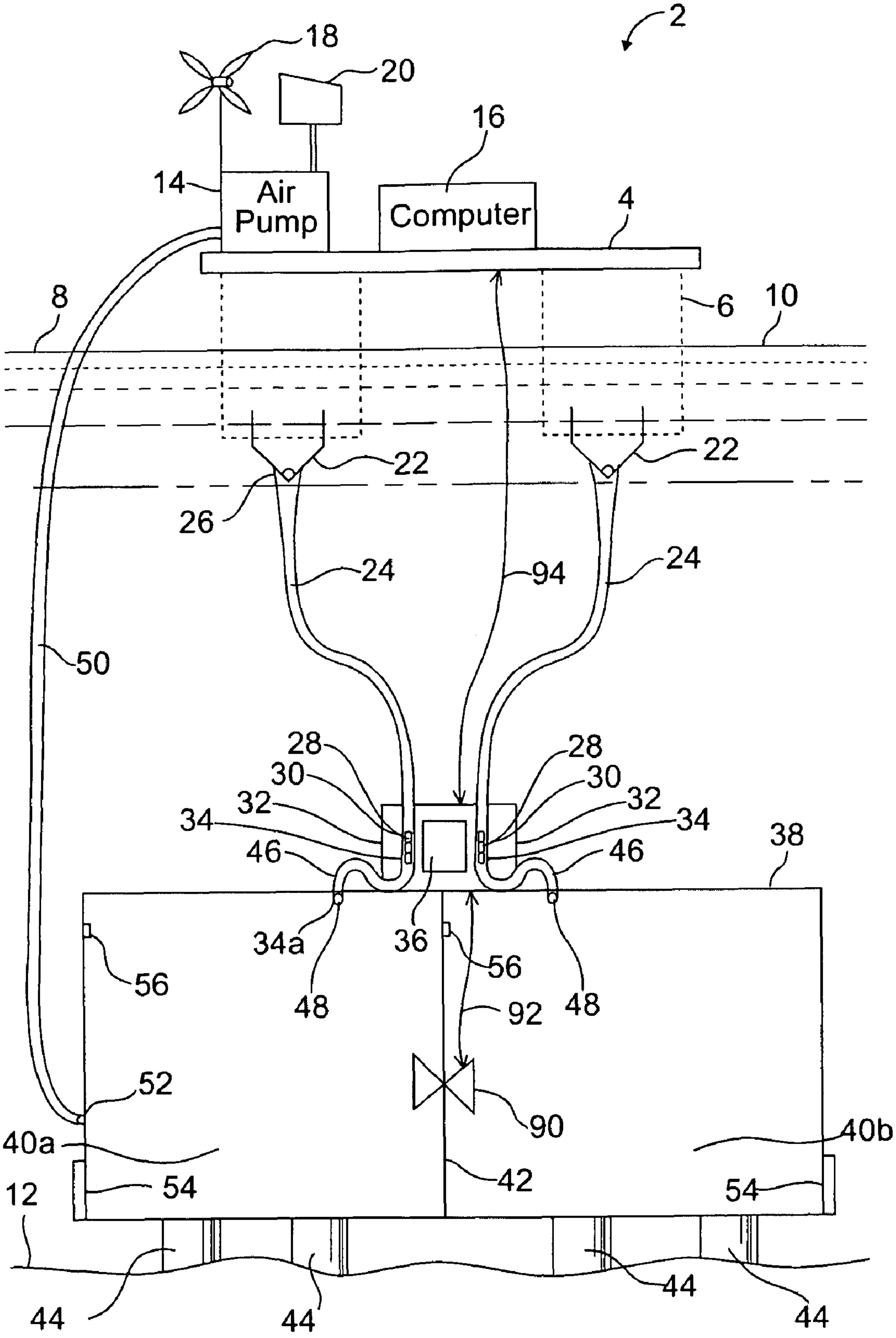
FIG. 1 is a side elevational view of a system for generating electric energy.

FIG. 1 illustrates a first embodiment of a system 2 for generating electric energy using hydrostatic water pressure differentials found at varying depths in all bodies of water, the methodology of which is considered herein to be another form of hydroelectric power generation. A platform 4 is attached to buoys 6 (shown in broken lines) floating in a relatively deep body of water 8, the surface of which is identified by reference numeral 10, the bottom of which is identified by reference numeral 12.

The platform 4 supports equipment that includes an above-water or surface air pump 14, a controlling computer 16, a wind-driven electricity generator 18 and a solar array 20 that generates electricity from sun light. The combined weight of the platform 4 and the various equipment it supports (14, 16, 18, 20 et al) requires the buoys 6 to provide a significant buoyant force and thus require the buoys 6 to extend below the water surface 10 by a relatively significant distance.

Ropes, cables or rigid beams 22 attached to the buoys 6 support a pair of flexible water conduits 24 that extend downwardly toward the bottom 12 of the body of water 8. Each water conduit 24 has a water intake opening 26, located below the water surface 10. The length of the cables 22 and the length of the buoys 6 below the surface 10 determine the depth of the intake 24 and the hydrostatic force present at the intakes 26.

Each conduit 24 has a second end 28 coupled to an input port 30 of a water-driven turbine 32, which is submerged well below the level of the water intakes 26. Two turbines 32 are shown. Both turbines 32 are coupled to an electric generator 36. The turbines 32 are configured such that rotation of either turbine 32, or both turbines 32 at the same time, causes the generator 36 to generate electricity, which is carried to the surface for distribution to the electric grid (not shown) by way of an insulated cable 94, which also carries control lines (not shown) between the computer 16 and various, submerged computer-controlled devices described herein. Whether the generator 36 is one that generates alternating current (A.C.) or direct current (D.C.) is a design choice.

The turbines 32 are designed and configured to be driven by flowing water as they are in a conventional hydroelectric dam. In addition to an input port 30, each turbine 32 has an output port 34 from which turbine waste water flows, after the flowing water surrenders kinetic energy to the turbine 32, causing it and the generator 36 to rotate.

In FIG. 1, the combined water-driven turbines 32 and generator 36 are depicted as being on top of a submerged, water-tight reservoir 38 having two, water-tight chambers 40A and 40B, which are defined by an air-tight wall 42. The reservoir 38 is preferably located far below the level of the water intakes 26 and is attached to the bottom 12 of the body of water 8 by legs or pillars 44. The reservoir 38 can also be kept submerged by ballast, not shown. The chambers 40A and 40B, preferably, but not necessarily have equal volumes.

The output ports 34 of the turbines 32 are coupled to a corresponding chamber 40A or 40B through turbine exhaust manifolds 46, discharge ends of which are coupled to corresponding computer-controlled chamber intake valves 48A and 48B at a water inlet of each chamber 40A and 40B. In one embodiment, the exhaust manifolds are embodied as water conduits, however, in another embodiment, the exhaust manifolds can be integrally formed to be part of the turbine housing.

The pathway between the intakes 26 to the computer-controlled intake valves 48 and the chambers 40 is sealed. The only way for water to flow into the chambers 40 is through an intake 26, flowing through a conduit 24, through a turbine 32, through an exhaust manifold and control valve 48 and falling into a chamber 40A or 40B. The flow of water from the intakes 26 and through a turbine 32, and the generation of electricity, is thus controlled by the computer opening and closing the valves 48A and 48B. At the same time that water starts flowing into a chamber 40*a* or 40*b*, an the air exchanging compressor 90 coupled between the two chambers 32A and 32B is activated by the controlling computer 16. The air exchanging compressor 90 captures or "scavenges" and recycles air in the first chamber 40A by directing it into the second chamber 40B to drive water in the second chamber 40B into the body of water 8 through a corresponding one-way water check valve or a sliding, water-tight door 54 as the water level rises in the first chamber.

Water will flow into the intake 26, through the conduit 24, turbines 32, driving the generator 36 as it goes, and flow into a chamber 40A or 40B, if the hydrostatic pressure inside the chamber 48A is less than the hydrostatic pressure at the intake 26. Electric energy can thus be generated so long as water flows through the turbines 34 with sufficient energy to drive the generator 36 as well as any load it might be connected to.

In order to generate electricity using the head pressure between an intake and a chamber, it is necessary to create a pressure differential by purging a chamber 40A or 40B of water and reduce internal hydrostatic pressure relative to the hydrostatic pressure at an intake 26.

Hydrostatic pressure inside the chambers 40A and 40B can be reduced below the hydrostatic pressure at the intakes 26 by driving water out of a chamber 40A or 40B and reducing its internal pressure. To start the system 2, water inside the chambers 40A and 40B is initially driven from a first chamber 40A or 40B by high-pressure air provided by a the surface-located air compressor 14. The surface air compressor 14 runs on electric power stored in one or more batteries (not shown) and which are charged using electricity generated from the wind turbine generator 18 or collected by the solar panels 20. The controlling computer 16 monitors battery charge state and controls the outputs of the wind-driven generator 16 and solar panel 20 accordingly. The controlling computer 16, which is also powered by one or both of the generator 18 or solar array 20, also controls operation of the air pump 14. The energy required to create a pressure differential between the intakes and chambers and the power to operate the system in a steady state is thus provided by environmentally benign, renewable energy sources.

The high-pressure air from the surface air compressor 14 is carried to one of the chambers, 40A for example, by way of a high-pressure air line 50, the distal end of which is coupled to a first, computer-controlled air valve 52. The computer controlled air valve 52 is opened and controlled by the computer 16 to allow high pressure into the chamber 40A. High pressure air drives water from the chamber 40A just as it does the water in the ballast tanks of a submarine.

The high-pressure air line 50 is shown connected to the left-side chamber 40A but whether the high-pressure air line 50 is coupled to the left side chamber 40A or right side chamber 40B is a design choice. When the air pressure at the air valve 52 reaches a sufficiently high level, air from the air pump 14, enters the left-side chamber 40A and displaces water from the chamber 40A just as ballast tanks of a submarine are "blown." Water flows out of the chambers 40A and 40B through a one-way check valve 54.

Compressed air is preferably provided to the chamber 40A until the water is emptied, however, the chambers need not be literally emptied of every drop of water they can contain. An "empty" chamber should be considered to be a chamber that has been purged of water using compressed air, but without driving so much water from the chamber that compressed air is vented into the body of water 8 and wasted, as can happen when compressed air is used to drive water from a ballast tank. The determination of whether a chamber is "empty" can be made by determining the water level inside the chamber. Determining the water level inside the chambers 40A and 40 can be measured a number of different ways but in a preferred embodiment, the water level is measured by one or more computer-controlled ultrasonic water level detectors 56 located inside the chambers, the detectors 56 being coupled to the controlling computer 16. In an alternate embodiment, water level inside the chambers 40 is measured by a mechanical float and transducer (not shown) coupled to the controlling computer 16, or by a series of electrodes (not shown) at various depths inside the chambers, each of which is also coupled to the controlling computer 16.

After the chamber has been emptied by compressed air, hydrostatic pressure inside the chamber 40A will be too high to allow water to flow into the chamber from the intake 26 end of the conduits 24. In order to reduce the hydrostatic pressure inside the chamber 40A, the air exchanging compressor 90 coupled between the two chambers 40A and 40B is activated by the controlling computer 16. The air exchanging compressor 90 scavenges high-pressure air in the first chamber 40A by directing it into the second chamber 40B to drive water in the second chamber 40B into the body of water 8 through a corresponding one-way water check valve or water-tight sliding door 54.

In a preferred embodiment, the air exchanging compressor 90 is inside the reservoir 38 and coupled to each chamber 40A and 40B as schematically shown in the figure. In an alternate embodiment not shown, the air exchanging compressor 90 is outside the reservoir 38 and submerged. In yet another embodiment that is also not shown, the air exchanging compressor 90 is above the water surface 10 on the platform 4 and coupled to each of the chambers 40A and 40B by high-pressure air lines not shown.

In order to reduce the pressure inside the chambers 40, the air exchanging compressor 90 is configured to pump air from a chamber 40, i.e., partially evacuate a chamber, relative to the hydrostatic pressure at the intakes 26. The air exchanging compressor 90 is thus tasked with moving highly compressed air that is initially supplied by the surface air compressor 14, from a first chamber 40A or 40B to a second chamber 40B or 40A respectively, and pumping down or partially evacuating the first chamber to allow it to receive water from the turbine outlet port 34. The term "waste water" is used herein to refer to water discharged from a turbine.

In steady state operation, water in one chamber 40A or 40B is driven from the chamber using high-pressure air driven by the air exchanging compressor 90. After the chamber 40A or 40B has been emptied, the air-exchanging compressor 90 re-uses the high-pressure air to empty the other chamber, 40B or 40A respectively and pumps down or even partially evacuates the first chamber, 40A or 40B respectively.

In an alternate embodiment, high-pressure air required during water purging cycles can be temporarily stored and retrieved in a high-pressure air tank or tank assembly, which can either be submerged and proximate to the chambers 40 or on the platform. An optional high-pressure tank used to store compressed air between cycles can facilitate the storage and retrieval of high-pressure compressed air between water-purging cycles by providing a high-pressure air reservoir cushion or reserve. It can also store high-pressure air required to initialize the system and eliminate the need for the surface air pump and its associated high-pressure air line 50.

When the hydrostatic pressure in a chamber is reduced below the hydrostatic pressure at an intake 26, opening a water control valve 54 at an inlet of a chamber 40A or 40B allows water to flow into an intake 26, downward through the conduit 24, through a turbine 32 and drive the generator 36 to generate electricity. Water will continue to drive the generator, filling the chamber 40A or 40B, reducing its volume and increasing hydrostatic pressure inside the chamber 40A or 40B until the hydrostatic pressure inside the chamber 40A or 40B equalizes relative to the hydrostatic pressure at the intake 26. When the hydrostatic pressure inside a chamber reaches a level where water flow rate is insufficient to drive the generator 36, the chamber 40 can be considered to be full. High pressure air in the second chamber 40B or 40A, (or from the aforementioned high-pressure tank assembly) respectively, is thereafter routed from the second chamber 40B or 40A into the just-filled chamber 40A or 40B by the air exchanging compressor 90. The second chamber 40B or 40A is thereafter pumped down or evacuated by the air exchanging compressor 90 to prepare the second chamber 40B or 40A to receive water that passes routed through the turbine 32 to drive the generator.

As a system, the chambers 40A and 40B, water level detectors 56, air-exchanging compressor 90, control valves 54 and controlling computer 16 are designed and configured to cyclically and repeatedly purge chambers and allow chambers to fill with water. One chamber 40A or 40B is purged of water and high-pressure air, allowing the other chamber to be filled with water that flows through a turbine 32 to drive the generator to generate electricity 36. While the chamber 40A or 40B is being filled, the other chamber 40B or 40A respectively is being purged of water using high pressure air. After the first chamber 40A or 40B is filled with water from a turbine, the system re-purges water from the first chamber while the second chamber begins to receive water from the turbine. The separate chambers 40A and 40B are repeatedly and cyclically filled with water from the intakes and emptied using compressed air. The chambers 40A and 40B are thus emptied by high pressure air that is re-used by shuttling the high-pressure air between the chambers after they're emptied.

Figure 2:
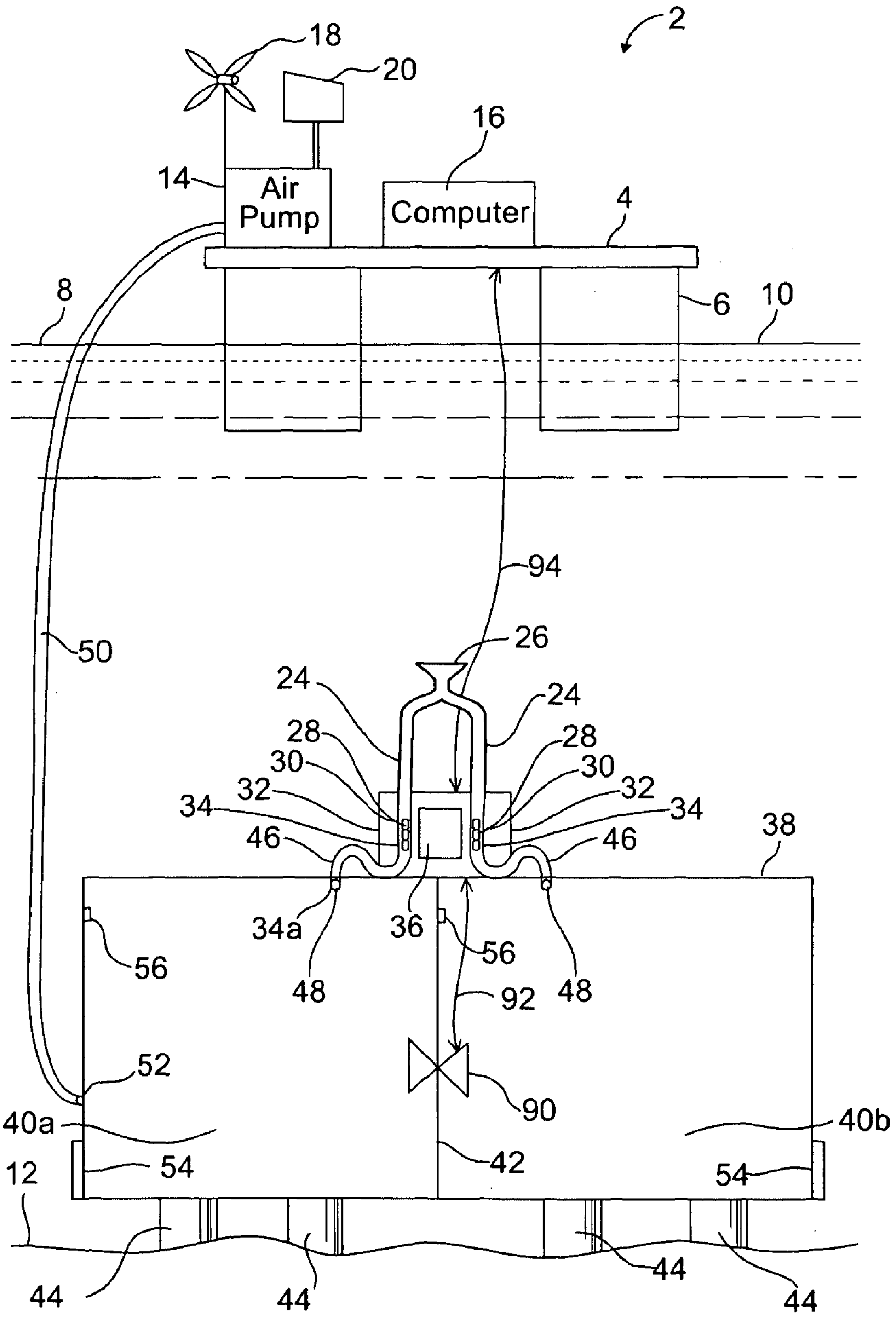
FIG. 2 is side elevational view of an alternate embodiment of a system for generating electric energy.

FIG. 2 illustrates a second embodiment of a system 2 for generating electric energy. The buoys 6 are shown using solid lines to better illustrate their location, when a platform 4 is used.

The principal difference between the embodiment of FIG. 1 and FIG. 2 is the use of a single intake 26 at a much lower depth in the body of water. Another difference between FIG. 1 and FIG. 2 is the use of a "Y" connection that splits or divides water input to the single intake 26 into two relatively short water conduits 24.

Using a single intake 26 set deep in the water as shown in FIG. 2, increases the hydrostatic or head pressure at the intake 26 over what it would otherwise be at a shallower depth. Lowering the intake 26 also enables the water conduits 24 to be shortened, which reduces head loss.

Figure 3:
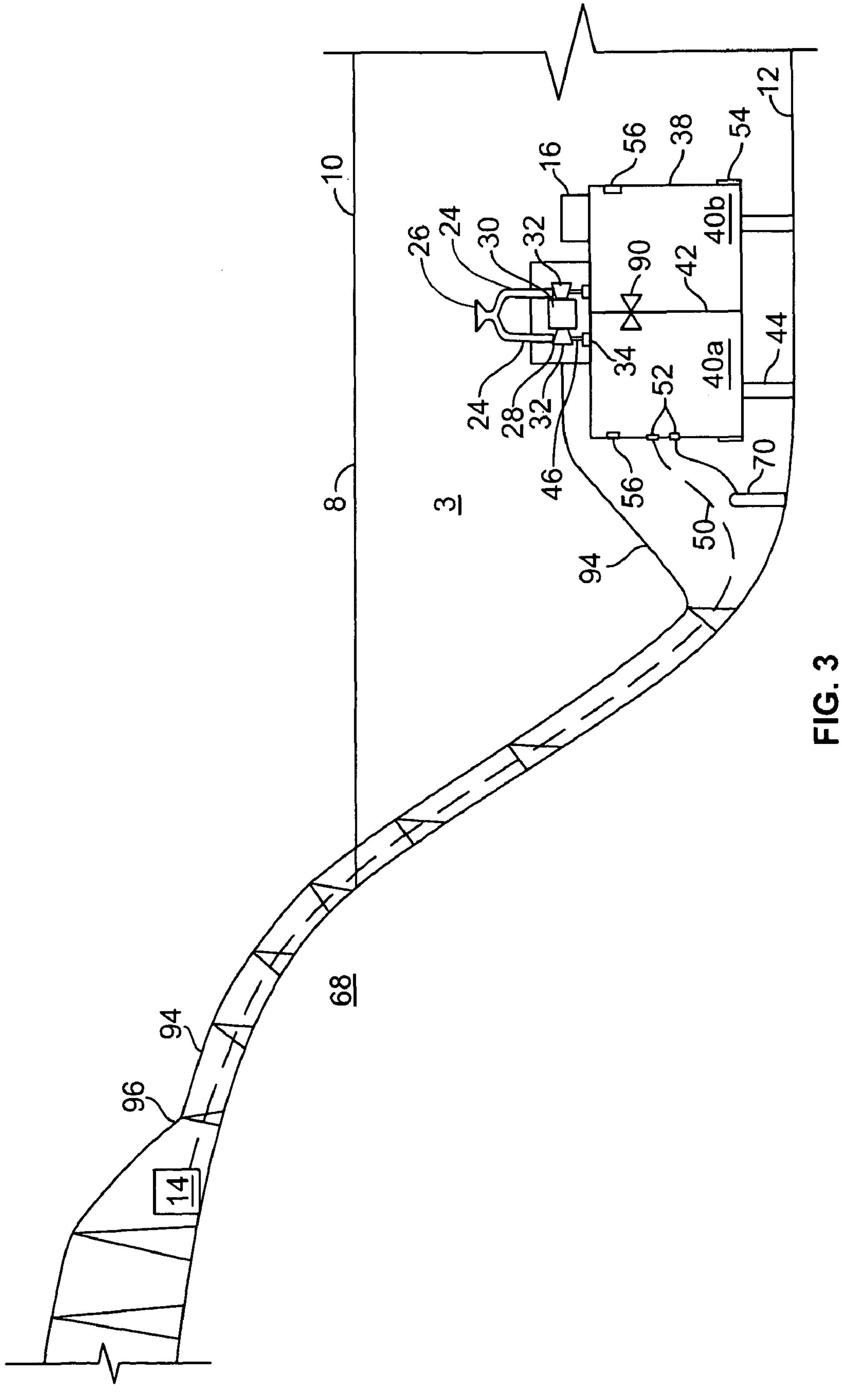
FIG. 3 is a side elevational view of another alternate embodiment of a system for generating electric energy.

FIG. 3 illustrates a third embodiment of a system 3 for generating electric energy using hydrostatic water pressure differentials. Various aspects of the system 3 of FIG. 3 can also be optionally used with the system 2 depicted in FIG. 1 and/or FIG. 2.

The embodiment shown in FIG. 3 omits the platform 4 shown in FIG. 1, the wind-driven generator 18 and solar array 20. The controlling computer 16 is also submerged and co-located with the water-tight reservoir 38.

As with the embodiment shown in FIG. 2, in FIG. 3, a single intake 26 is located close to the reservoir 38 and split into two separate, short water conduits 24. The water intake 26 is preferably located less than a few inches above the turbines 32. As with the embodiment shown in FIG. 2, shortening the water conduits 24 reduces the head loss that a long water conduit would cause, which increases water pressure on the turbine.

The surface located air compressor 14, which provides start-up air pressure, is located on shore 68. High-pressure start-up air from the shore-located air compressor 14 is carried through a submerged high-pressure air line 50 that runs over the bottom 12 of the water body 8. Electric power generated by the generator 36 is carried through a submerged cable 94 that runs over the bottom 12 of the water body 8 to the electric power grid 96. An optional high-pressure air tank assembly 72 provides start-up air and can store compressed air between cycles. In an optional embodiment (not shown), a boat or barge that floats over the system (2 or 3) to provide start-up compressed air.

Those of ordinary skill in the art will recognize that the systems described above and depicted in the figures requires an initial start up power to empty at least one of the chambers 40A or 40B initially. In the embodiment shown in FIG. 1 and FIG. 2, system start-up or "initialization" power is preferably provided by renewable energy generated by the wind-driven generator 18 or the solar panels 20 described above. In the embodiment of FIG. 2, initialization power can be provided from the same sources located on shore or land 68 and carried to the submerged system 3 via submerged cable.

Wind power is known to be unpredictable but can be generated with or without sunlight. Solar power is very predictable but is not available at night. The systems depicted in the figures store wind generated and/or solar generated power in a battery array (not shown) until it is needed for the system's initialization.

Once the start up power has been provided to the systems 2 and 3 and hydrostatic water pressure is driving the generator 36, the systems 2 and 3 can generate electric power, regardless of whether the wind is blowing or the sun is shining. The systems 2 and 3 can therefore advantageously generate electric power when other renewable energy sources might not be able, such as at night when the wind also frequently stops blowing.

Those of ordinary skill in the art will recognize that the efficacy of the systems in each of the figures will depend on several factors that include but which are not limited to water depth, chamber volumes, water conduit head losses and turbine efficiency. The systems can nevertheless work in any body of water, but their efficacy, including output power, will be determined by the aforementioned factors.

The descriptions set forth above are for purposes of illustration. Those of ordinary skill will recognize that while the systems depicted in the figures use two intakes 24, two conduits 26 and two turbines 44 that drive a single generator 46, equivalent alternate embodiments uses a single intake 24, a single conduit 26, one turbine and one generator 46 with turbine effluent being selectably and alternately routed to a first chamber 40A or 40B and then to the other chamber 40B or 40A using one or more computer-controlled valves, not shown but well known to those ordinary skill. Another alternate embodiment uses a single, short conduit 26, such as the ones shown in FIG. 2 and FIG. 3, routing water to two or more separate turbines, each of which is coupled to one or more generators.

The foregoing description is for purposes of illustration and not for limiting or defining the invention. The invention and its scope is defined by the appurtenant claims.

What is claimed is:

1. A system for generating electric energy comprising:

a reservoir submerged in a body of water at first depth below the water body surface, said reservoir having at least one internal chamber at least partially devoid of water and configured to have a first internal pressure;

an electric generator at a second depth above the first depth, said electric generator being connected to and capable of being driven by a water-driven turbine having a water input port proximate to the second depth and having a waste water outlet coupled to the at least one internal chamber;

said reservoir being configured such that the first internal pressure is less than hydrostatic pressure at the second depth;

whereby water entering the at least one internal chamber flows through the water input port, through the turbine, driving the electric generator; and at least one water conduit having a first intake opening at a third depth below the water body surface and above the second depth, said at least one water conduit having a second opening coupled to the water input port, the at least one water conduit being configured to be located in the body of water such that hydrostatic pressure at the first intake is greater than the first internal pressure; and a turbine waste water exhaust manifold coupled between the water outlet and the first internal chamber:

whereby water enters the first intake opening and flows into the at least one internal chamber by flowing through the turbine and driving the electric generator.

2. The system of claim 1, wherein the water level detector is an ultrasonic water depth detector.

3. A system for generating electric energy comprising:

a reservoir submerged in a body of water at first depth below the water body surface, said reservoir having at least one internal chamber at least partially devoid of water and configured to have a first internal pressure;

an electric generator at a second depth above the first depth, said electric generator being connected to and capable of being driven by a water-driven turbine having a water input port proximate to the second depth and having a waste water outlet coupled to the at least one internal chamber;

said reservoir being configured such that the first internal pressure is less than hydrostatic pressure at the second depth;

whereby water entering the at least one internal chamber flows through the water input port, through the turbine, driving the electric generator;

a reservoir having first and second internal chambers, each chamber capable of being alternately filled with water, emptied of water by compressed air and at least partially evacuated relative to hydrostatic pressure at the first intake opening;

a water level detector in at least one of the first and second detectors;

an air scavenging compressor, operatively coupled to the first and second internal chambers, the air scavenging compressor configured to pump air from the first chamber into the second chamber, and thereafter, pump air from the second chamber back to the first chamber, responsive to water levels detected by the water level detector; and a controller, operatively coupled to the water level detector and the air scavenging compressor, the controller being configured to direct the air scavenging compressor to pump air into the first chamber from the second chamber when the first chamber is substantially full of water, and to direct the air scavenging compressor to pump air from the first chamber to the second chamber when the second chamber is substantially full of water.

4. The system of claim 3, further including an air pump, operatively coupled the first chamber, the air pump providing compressed air to drive water from the first chamber.

5. The system of claim 4, wherein the air pump is located on at least one of: a floating platform; a boat; land.

6. The system of claim 5, further including a renewable energy source coupled to and controlled by the controller, the renewable energy source being configured to provide power to the air pump.

7. The system of claim 6, wherein the renewable energy source is at least one of: a wind-driven turbine and a solar panel.

8. The system of claim 7, further including a battery coupled to the renewable energy source, the controller and the air pump.

9. The system of claim 4, further including a platform configured to float on the body of water, said platform supporting the air pump, the controlling computer and renewable energy source.

10. The system of claim 9, wherein the air scavenging compressor is located on the platform.

11. A method of generating electricity comprising the steps of:

driving water from an internal chamber of a reservoir submerged in a body of water having a bottom and a surface, the reservoir being submerged at a first depth below the water body surface, the internal chamber at least partially devoid of water;

evacuating the internal chamber to achieve a first hydrostatic pressure inside the internal chamber;

obtaining from the body of water, water at a second hydrostatic pressure that is greater than the first pressure; and routing water obtained at said second pressure to said internal chamber through a water-driven turbine coupled to an electricity generator;

wherein the step of driving water from an internal chamber includes the step of driving water from an internal chamber of a reservoir attached to the bottom of the body of water using compressed air;

wherein the reservoir is at a depth whereat the reservoir is subjected to a third hydrostatic pressure greater than the first and greater than the second hydrostatic pressures, and wherein the step of driving water from an internal chamber is comprised of:

providing high pressure air into the internal chamber, the high pressure air being at a pressure greater than the third hydrostatic pressure;

recovering the high pressure air from the internal chamber to drive water from a second internal chamber; and at least partially evacuating the internal chamber to a pressure less than the second hydrostatic pressure.

12. The method of claim 11, further including the step of providing compressed air to the internal chamber from a compressor above the surface of the body of water.

13. The method of claim 12, further including the step of floating the air compressor and the renewable energy source on the surface of the body of water.

14. A method of generating electricity comprising the steps of:

driving water from an internal chamber of a reservoir submerged in a body of water having a bottom and a surface, the reservoir being submerged at a first depth below the water body surface, the internal chamber at least partially devoid of water;

evacuating the internal chamber to achieve a first hydrostatic pressure inside the internal chamber;

obtaining from the body of water, water at a second hydrostatic pressure that is greater than the first pressure;

routing water obtained at said second pressure to said internal chamber through a water-driven turbine coupled to an electricity generator;

wherein the step of obtaining water at a second hydrostatic pressure includes receiving water from the body of water at an intake port of a water conduit coupled to said generator;

detecting the amount of water in the internal chamber; and recovering the high pressure air from the internal chamber to drive water from a second internal chamber and at least partially evacuating the second internal chamber to a pressure less than the second hydrostatic pressure, responsive to the step of detecting the amount of water in the internal chamber.

15. The method of claim 14, further including the step of providing the compressed air from an air compressor powered by a renewable energy source.

* * * * *